Sept. 2, 1952 J. J. OVERMAN 2,609,080
STRAW WINDROWER
Filed Dec. 5, 1946 2 SHEETS—SHEET 1

Inventor
JOSEPH J. OVERMAN
By Williamson & Williamson
Attorney

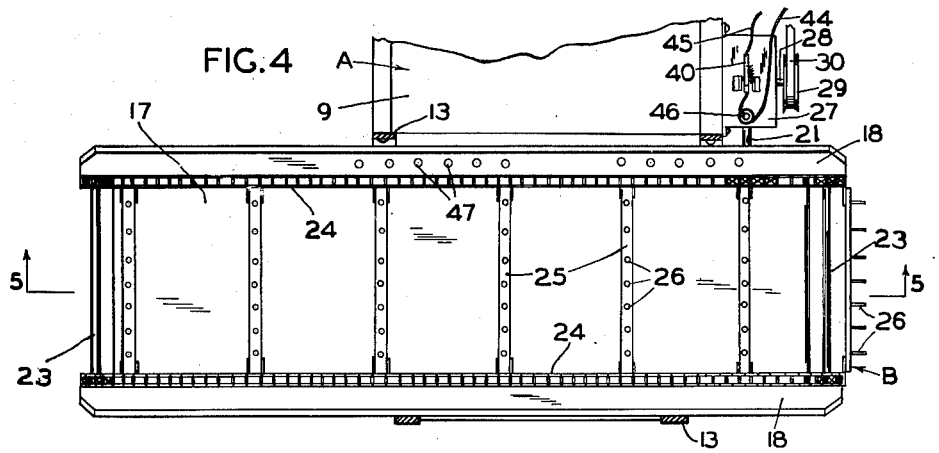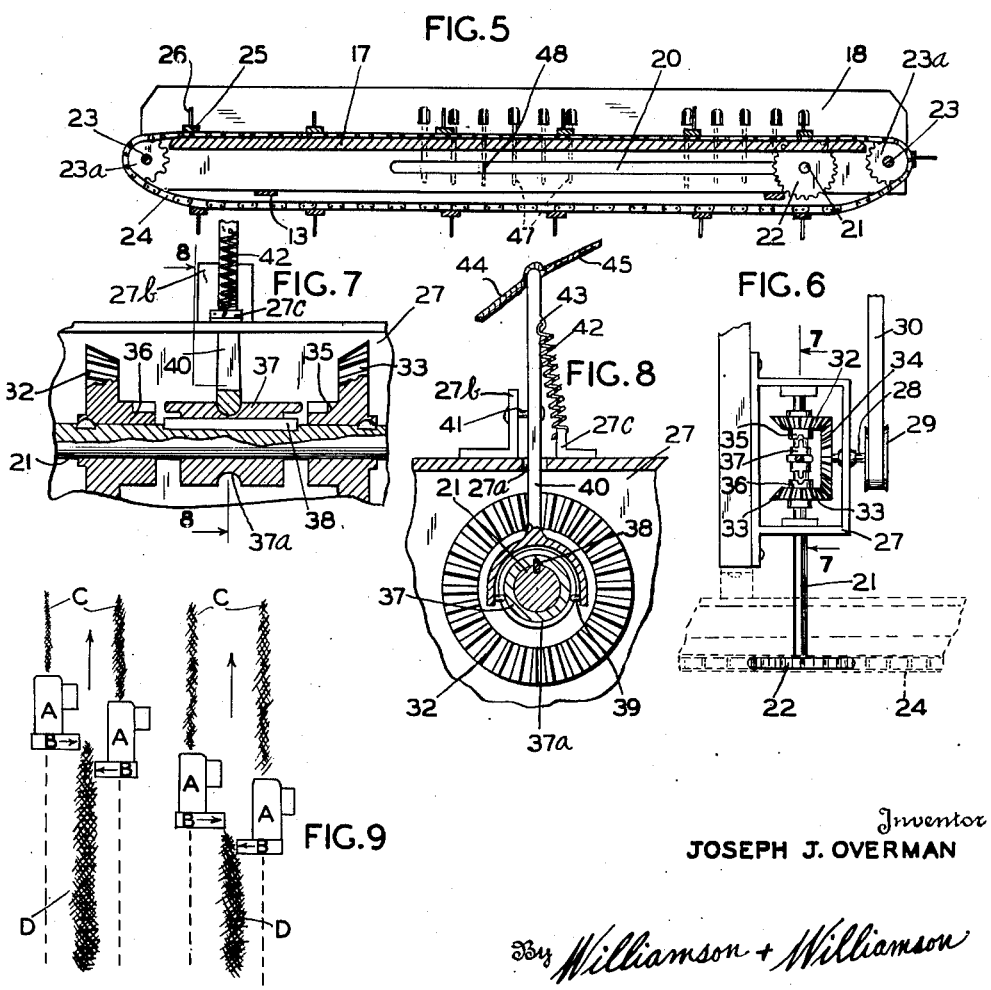

Patented Sept. 2, 1952

2,609,080

UNITED STATES PATENT OFFICE 2,609,080

STRAW WINDROWER

Joseph J. Overman, Albany, Minn.

Application December 5, 1946, Serial No. 714,312

1 Claim. (Cl. 198—110)

This invention relates to straw windrowing devices particularly adapted for use on combines employed for picking up and threshing grain and other crops in the field.

It is a common practice in certain parts of the country in harvesting many of the small grains, such as wheat, barley, oats, as well as other crops, such as soybeans, etc., to cut the standing crop in the field by what is known as a swather, which in addition to cutting the crop also lays it in the field in swaths or windrows. Normally the crop is allowed to lie in the windrows to mature for some little time before it is threshed. Thereupon, after the grain or other crop has sufficiently matured, a combine is driven over the field, the combine acting to pick up the windrowed grain or other crop and to thresh the same. The straw from the threshed grain is ordinarily delivered by the combine back onto the field into windrows, which are spaced apart center-to-center at a spacing similar to the original spacing of the original unthreshed grain windrows. The straw is quite valuable for many purposes, and it is very often gathered from these straw windrows and thereafter utilized.

It is an object of the present invention to provide a novel and improved straw windrower which can be mounted on a combine and can be employed for laying the discharged straw from unthreshed windrows in straw windrows or swaths which are spaced apart twice the width of the center-to-center spacing of the original unthreshed windrows, thereby eliminating approximately one-half of the time and labor which would otherwise be required in gathering the straw discharged from the combine by reducing by one-half the number of straw windrows.

More specifically it is an object of the invention to provide a cross-conveyor which can be mounted, as on a combine, to receive the straw discharged from the combine and which conveyor can be selectively operated to discharge either at the right side of the machine or at the left side of the machine, the conveyor being extensible both to the right and to the left of the machine so as to permit the straw to be discharged into the same windrow on two successive swings of the machine through the field.

A further object is to provide a novel and improved straw windrower which can be mounted as on a combine, which windrower includes a cross-conveyor, the upper run of which can be selectively driven in either direction to deliver the straw therefrom selectively to the right and left sides of the combine together with means for automatically sliding the cross-conveyor laterally of the combine to the right immediately prior to the time that the conveyor is initially driven so that its upper run moves to the right, and for automatically sliding the conveyor laterally to the left immediately prior to the time that the conveyor is initially driven so that its upper run moves to the left.

The objects and advantages of the invention will more fully appear from the following description made in connection with the accompanying drawings wherein like reference characters refer to the same or similar parts throughout the various views and in which:

Fig. 4 is a horizontal section taken substantially on the line 4—4 of Fig. 1 as indicated by the arrows.

Fig. 5 is a vertical section taken substantially on the line 5—5 of Fig. 4 as indicated by the arrows.

Fig. 6 is a top plan view in enlarged scale showing the driving mechanism, the top of the gear box illustrated being removed and certain portions of the cross-conveyor being shown in dotted lines.

Fig. 7 is a vertical section taken in still larger scale substantially on the line 7—7 of Fig. 6.

Fig. 8 is a vertical section taken substantially on the line 8—8 of Fig. 7, only portions of the gear box being illustrated; and Fig. 9 is a diagrammatic view illustrating the manner in which a combine equipped with a straw windrowing device of the invention is employed in picking up grain from windrows, threshing the grain, and delivering the straw back on to windrows in a field.

Figure 1:
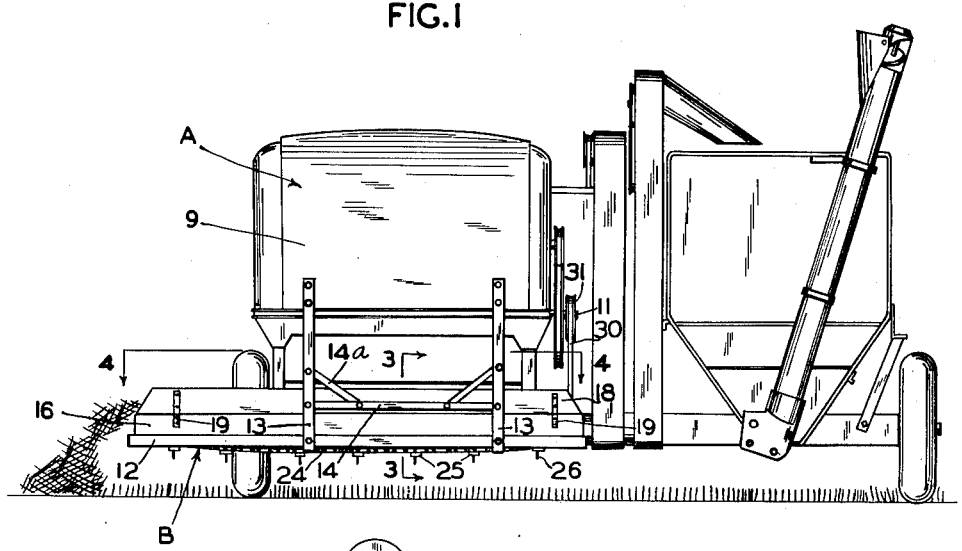
Fig. 1 is a view in rear elevation of a combine to which a straw windrowing device of the invention has been applied, the windrowing device being shown as discharging straw at the left side of the combine.
Figure 2:
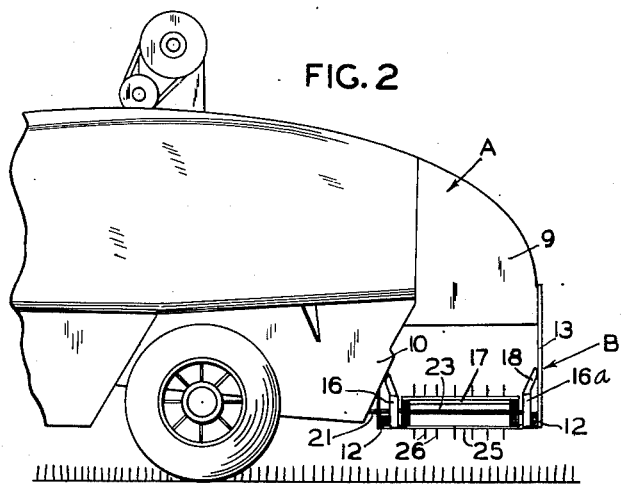
Fig. 2 is a view in side elevation looking toward the left side of the machine shown in Fig. 1.

Certain portions of a typical combine A employed for the threshing of grain in the field are illustrated. The said combine includes a straw delivering hood 9 located at the rear of the combine and projecting above the level of the ground from a rear panel 10 of the machine. The combine also includes a rotating shaft 11, which is shown as extending laterally from the righthand side of the machine. This shaft may be the straw blower shaft or any other rotating shaft of the machine.

In accordance with the present invention, a pair of tracks 12 are mounted in spaced parallel relation at the rear of the combine A to extend transversely of the machine. In the illustrated embodiment the two tracks 12 are secured to horizontal portions of U-shaped strap brackets 13, which have their inner shorter legs fastened to the rear panel 10 of the combine and which have longer legs attached to the rear portion of the hood 9. To strengthen and brace the brackets 13 at the rear of the machine a transverse brace 14 and diagonal braces 14a are provided. The two tracks 12 are preferably of C-formation in cross section as shown with their open sides facing toward each other, and the tracks form runways for rollers 15 journaled on short shafts 15a secured to sides 16 and 16a of a cross-conveyor designated as an entirety by the letter B. A horizontal conveyor deck 17 runs across between the conveyor sides 16 and 16a, and oppositely flaring side extensions 18 are preferably secured to the conveyor sides 16 and 16a as by brackets 19 so that the conveyor frame forms in reality a trough underlying the hood 9 to receive the straw discharged therefrom. The conveyor side 16 is most closely spaced to the rear panel 10 of the machine, and it has an elongated horizontal slot 20 cut therein through which a conveyor drive shaft 21 extends. By reason of the fact that the conveyor frame is mounted on the rollers 15 which can roll in the tracks 12 and the side 16 of the conveyor is provided with a slot 20 through which the drive shaft 21 extends, it will be readily seen that the conveyor B may be slid laterally of the combine A either to the right or to the left within the limits of the slot 20.

Journaled in end portions of the two sides 16 and 16a of the conveyor frame to extend across between these sides are a pair of conveyor shafts 23, which carry sprockets 23a over which conveyor chains 24 are trained. The said conveyor chains carry transverse slats 25 on which upstanding teeth 26 are mounted. The upper run of the slat and chain conveyor thus formed works over the deck 17 while the under run of the conveyor is located in spaced relation below the deck and extends underneath the supporting brackets 13. The drive shaft 21 carries a driving sprocket 22 which engages with one chain 24 of the conveyor to drive the entire conveyor.

Secured to the right side of the rearwardly extending portion of the combine A forward of the rearward extending portion of the drive shaft 21 is a cover equipped gear box 27. A transversely extending stub shaft 28 is journaled in one side wall of the gear box 27, and this stub shaft carries a pulley 29 outwardly of the gear box over which an endless belt 30 is trained, the said belt also running over a pulley 31 carried by the rotating shaft 11 of the combine. It will of course be appreciated that it is possible to drive the shaft 28 in any other suitable manner from a rotating shaft of the combine. The drive shaft 21 extends forwardly through the gear box 27 and is journaled therein, and in the illustrated form of the device there are journaled on the forwardly extending portion of the shaft 21 within the gear box a pair of beveled gears 32 and 33 respectively, which both mesh with a beveled pinion 34 mounted within the gear box on the stub shaft 28. The two beveled gears 32 and 33 carry on their opposing faces half clutch members 35 and 36 respectively, which are adapted to be selectively engaged by a sliding clutch member 37 slidably mounted on a spline 38 carried by the shaft 21. The clutch member 37 is provided with a groove 37a, which receives a pair of opposed pins 39 mounted on a shipper fork 40, which extends upwardly through a slot 27a formed in the cover of the gear box 27. The cover of the gear box 27 may be equipped with an upstanding lug 27b which runs well upwardly above the level of the box, and the shipper fork 40 is pivotally mounted by pivot 41 on this lug. The cover of the gear box is also preferably equipped with a shorter lug 27c adjacent the slot 27a, this lug being located at a lower level than the pivot 41. A coil spring 42 is connected at one end to the lug 27c and is connected at its other end to an eye 43 on the shipper lever 40 well above the pivot 41. Preferably the upper end of the lever 40 will have two cords 44 and 45 connected thereto, which may be carried forwardly to a point adjacent the driver's seat of the tractor employed for pulling the combine so that either cord may be pulled by the tractor driver to actuate the upper end of the shipper lever 40 in opposite directions as the respective cords are pulled. For this purpose the cord 44 may be run rearwardly from the upper part of the shipper lever 40 over a sheave 46 mounted as on the rear portion of the cover of gear box 27, while the cord 45 may run directly forwardly to the tractor from the upper end of the shipper lever. With this arrangement it will be seen that the drive shaft 21 may be driven in either direction depending on whether the shipper lever 40 is swung to cause engagement between the clutch member 37 and the half clutch member 35 or the half clutch member 36. The spring 42 has a dead-center action so that, when the upper end of the shipper lever 40 is swung either forwardly or rearwardly past a dead-center position, the spring 42 will maintain the clutch parts in engagement.

Figure 3:
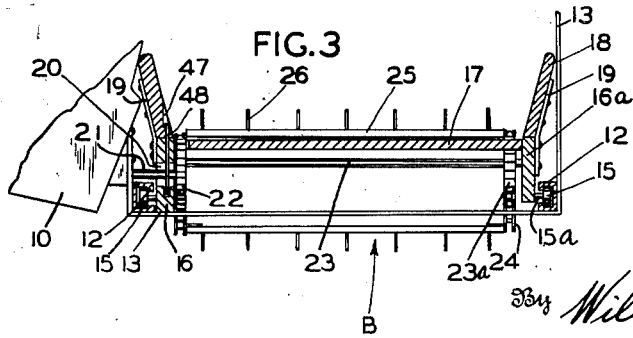
Fig. 3 is a vertical section taken substantially on the line 3—3 of Fig. 1 as indicated by the arrows.

Preferably the conveyor side 16 and the adjacent side extension 18 are provided with a number of transversely spaced pin-receiving openings 47, which are best illustrated in Figs. 3 and 5 and which may alternately receive one or two pins 48 to limit the effective length of the slot 20 through the confines of which the drive shaft 21 may pass. By mounting these pins 48 in the proper openings 47 adjustment of the lateral extension of the conveyor to the left and to the right of the machine can be made to accommodate the straw windrowing device for use on combines of different widths as will presently appear.

Let us assume that the conveyor B is in the position illustrated in Figs. 1, 4, and 5 of the drawings and that the shaft 11 rotates in a counterclockwise direction as viewed from the right side of Fig. 1. The shaft 28 will accordingly be driven in a counterclockwise direction as viewed from its right end. Let us further assume that the upper end of the shipper lever 40 has been swung rearwardly by actuation of the cord 44 so that the sliding clutch member 37 is engaged with the half clutch member 35 and accordingly the drive shaft 21 is rotating in a counterclockwise direction as viewed in Fig. 5 or from the rear of the machine. At that time the sprocket 22, which revolves with the drive shaft 21, is driving the upper run of the endless conveyor to the left and the shaft 21 will be disposed in the right end portion of the slot 20. Straw delivered from the hood 9 of the combine A will be discharged onto the deck 17 of the conveyor and the slats and teeth 25 and 26 of the upper run of the conveyor will engage the discharged straw and carry the same to the left side of the machine to discharge the same on to the ground from the left end of the conveyor B into a windrow located laterally of the left side of the combine. Now as the cord 45 is pulled, the shipper lever 40 will be swung so as to throw the sliding clutch member 37 into engagement with the half clutch member 36 while disengaging the sliding clutch member 37 from the half clutch member 35, and thereupon the drive shaft 21 will rotate in a clockwise direction. As the shaft 21 begins to rotate in a clockwise direction, the slat and chain conveyor will temporarily remain stationary and the sprocket 22 riding the forward chain 24 of the conveyor will slide the entire conveyor B laterally to the right of the combine A. In other words, the conveyor being supported by the rollers 15 riding in the tracks 12 will be quite free to move to the right, offering less friction to the lateral shifting movement than the frictional resistance which would be caused by the driving of the upper run of the conveyor to the right. Accordingly the entire conveyor B will be extended toward the right side of the machine until such time as the movement to the right of the conveyor is stopped by the drive shaft 21 coming in contact with a stop pin 48 or until the shaft 21 rides to the left end of the slot 20. Thereupon the sprocket 22 engaging the forward chain 24 of the conveyor will cause the upper run of the conveyor to be driven to the right and the straw discharged on to the deck 17 of the conveyor will be carried by the upper run of the conveyor to discharge from the right end of the conveyor at the right side of the combine A. Similarly, when the pull cord 44 is actuated to shift the sliding clutch member 37 in the opposite direction to bring it into engagement with the half clutch member 35, the drive shaft 21 will be rotated in counterclockwise direction, similarly causing the conveyor to be shifted to the left, and after the shifting of the conveyor to the left has been accomplished, causing the upper run of the conveyor to move to the left and discharge the straw to the left of the combine. At each time that a shift in the direction of rotation of the drive shaft 21 is made, the entire conveyor slides for a limited distance laterally of the combine, and thereafter the direction of movement of the upper run of the conveyor is changed so that the upper run thereafter moves in the direction toward which the conveyor has been shifted. The shifting of the conveyor takes place automatically therefore just immediately to the time that the direction of movement of the upper run of the conveyor is changed.

Attention is now directed to Fig. 9 of the drawings which diagrammatically illustrates the action of a combine equipped with the straw windrowing device of the invention. There is there represented a field having four windrows C of unthreshed grain thereon, the windrows being shown in full lines and positions previously occupied by these windrows being indicated in dotted lines after the windrows have been removed from the field. There are diagrammatically illustrated on the field first, second, third, and fourth positions of a single combine A, these positions representing relative positions that the combine will occupy during successive sweeps through the field in threshing the grain from the various windrows C. Let us assume that the combine is to make a first sweep to thresh the grain in the first windrow C at the left of the sheet and is then to make second, third, and fourth sweeps to thresh the grain in the second, third, and fourth windrows C from the left-hand side of the sheet. During the first sweep of the combine the drive shaft 21 of the conveyor B will be so actuated that the conveyor will be extended to the right side of the machine and the upper run of the conveyor will move as indicated by the arrow to discharge the straw to the right of the machine into a windrow D. During the second sweep of the combine to thresh the second windrow C of grain, the conveyor B will be slid to the left of the combine and the upper run of the conveyor will be moved to the left as indicated by the arrow to also discharge the straw on to the same windrow D. During the third sweep of the combine the conveyor will again be slid to the right, while during the fourth sweep the conveyor will be slid to the left so that during both the third and fourth sweeps the straw will be discharged into a second windrow D. In other words, by reason of the fact that during a first sweep of a field the straw from one windrow of unthreshed grain is discharged at the right of the combine into a straw windrow intermediate the original position of the first unthreshed grain windrow and the next succeeding unthreshed grain windrow and during the second sweep of the combine the straw from the second windrow of unthreshed grain is discharged at the left of the combine into the same straw windrow and during the third and fourth sweeps of the combine through the field the straw from the third and fourth windrows of unthreshed grain are deposited into a second straw windrow midway between the positions previously occupied by the third and fourth windrows of unthreshed grain, it will be seen that the straw from two windrows of unthreshed grain are concentrated into a single straw windrow and that the spacing between adjacent straw windrows is twice the spacing between adjacent windrows of the unthreshed grain. Thus when the straw is eventually gathered from the straw windrows D, only half as many sweeps through the field will have to be taken as would otherwise be the case if the conveyor B of the invention was not employed. Approximately half the work of gathering the straw is thus eliminated by use of the invention.

Actually in employing the slidable conveyor B of the invention, it is unnecessary to project the discharge end of the conveyor beyond the combine half the distance of the spacing between windrows of unthreshed grain. The carryover of the straw by reason of its movement laterally from the point of discharge of the conveyor to the ground will laterally throw the grain part of the necessary distance away from the side of the combine. In some instances also it may be desirable to form what amounts to a double windrow of the straw rather than to pile the straw from one sweep of the machine directly onto the straw from the second sweep of the machine. As the sliding movement of the cross-conveyor of the present invention can be readily controlled by the driver of the tractor which is drawing the combine through the field, it is very easy for the farmer to shift the lateral position of the conveyor without stopping his tractor after a single sweep of a field has been made. As has been above pointed out, the degree of extension of the conveyor laterally at the two sides of the combine can be controlled by the stop pins 48 so that for combines of different widths easy adjustment of the windrowing device can be made.

Attention is particularly called to the feature of the device whereby, as the direction of revolution of the driving shaft 21 is changed, the conveyor remains stationary until after the lateral shifting of the conveyor has been accomplished to the new side of the machine, and thus the straw is always discharged in an even straight windrow after the direction of movement of the upper run of the conveyor has been shifted.

While the present device is primarily intended for use on combines, it can also be used on other farm implements to space windrows of discharged material at a spacing equal to twice the width of the swath taken by the particular machine.

It will be seen that a highly efficient straw windrowing device has been provided which will save considerable time and labor.

It will of course be understood that various changes may be made in the form, details, arrangement, and proportions of the various parts without departing from the scope of the present invention, which generally stated consists in the matter shown and described and set forth in the appended claim.

I claim:

A straw windrowing device for combines having in combination guides adapted to be transversely mounted on a combine, a conveyor frame slidably mounted on said guides for movement laterally of the combine to the right and to the left, an endless slat and chain conveyor mounted in said conveyor frame, a portion of said conveyor frame being longitudinally slotted, a drive shaft extending through the slotted portion of said conveyor frame, a sprocket carried by said shaft and engaging the upper run of one of the chains of said conveyor intermediate the ends of the conveyor, and means for selectively rotating said drive shaft and said sprocket in opposite directions to cause said conveyor frame to slide a limited distance in the direction the upper run of the conveyor is driven and thereafter to remain relatively motionless while said upper run is driven and until said sprocket is rotated in the opposite direction whereupon said conveyor frame will slide a limited distance in the opposite direction and thereupon remain motionless until the direction of said sprocket is again reversed.

JOSEPH J. OVERMAN.

REFERENCES CITED

The following references are of record in the file of this patent:

UNITED STATES PATENTS

| Number | Name | Date |
|---|---|---|
| 308,867 | Ayres | Dec. 9, 1884 |
| 769,947 | Kramer | Sept. 13, 1904 |
| 833,456 | Goodfellow | Oct. 16, 1906 |
| 837,053 | Gilman | Nov. 27, 1906 |
| 979,442 | Crismon | Dec. 27, 1910 |
| 1,089,028 | Whittenburg | Mar. 3, 1914 |
| 1,830,740 | Leech | Nov. 3, 1931 |
| 2,018,360 | Heintges | Oct. 22, 1935 |